Figure 2:
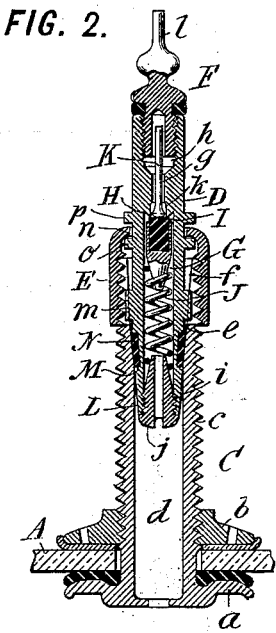

(No Model.)

G. H. F. SCHRADER.
TIRE VALVE OR THE LIKE.

No. 604,424. Patented May 24, 1898.

WITNESSES:
Fred White
Thomas F. Wallace

INVENTOR:
George H. F. Schrader
By his Attorneys,
Arthur C. Fraser & Co

THE NORRIS PETERS CO., PHOTO-LITHO., WASHINGTON, D. C.

UNITED STATES PATENT OFFICE.

GEORGE H. F. SCHRADER, OF NEW YORK, N. Y.

TIRE-VALVE OR THE LIKE.

SPECIFICATION forming part of Letters Patent No. 604,424, dated May 24, 1898.

Application filed November 18, 1896. Serial No. 612,545. (No model.) Patented in England December 3, 1896, No. 27,532; in France December 8, 1896, No. 262,009; in Belgium December 9, 1896, No. 125,090, and in Austria January 7, 1897, No. 47/57.

*To all whom it may concern:*

Be it known that I, GEORGE H. F. SCHRADER, a citizen of the United States, residing in the city, county, and State of New York, have invented certain new and useful Improvements in Tire-Valves or the Like, (which have been patented in Great Britain December 3, 1896, No. 27,532; in France December 8, 1896, No. 262,009; in Belgium December 9, 1896, No. 125,090, and in Austria January 7, 1897, No. 47/57,) of which the following is a specification.

This invention relates to valves for pneumatic tires and the like and aims to provide certain improvements therein.

It is customary to clamp to a tire or to clamp within the valve-cot thereof a metal valve-tube having an external thread and an internal socket, within which the end of a valve member is clamped by a screw-threaded sleeve screwing on the end of the valve-tube. In such constructions the valve member has had a tubular extension having a cross-port constituting the valve-seat at its inner end, and a rubber tube surrounding this extension has been relied on to serve as the valve proper and to make a tight joint at the coupling. Difficulty in securing satisfactory results with such construction has been found, owing to the speedy impairment of the rubber tube. Leakage at the joint is endangered, and the distortion of the tube to secure its packing function impairs its action as a valve, while a short use causes it to so adhere to the parts that its removal, which is necessary to effect deflation, virtually destroys it.

My invention aims to provide a valve member which shall constitute in itself a complete valve proper, capable of being clamped to any tire-tube, with a leak-tight joint independent of the valve proper, which valve members can be separately sold and can be applied and removed as desired without difficulty or danger of impairment and by any ordinary person.

To this end in carrying out the preferred form of my invention I provide a valve member with a tapering attaching end surrounded by a groove containing a packing-ring for fitting the tapering socket in the tire-tube, having a sleeve for screwing on the end of the tire-tube and forcing the valve member therein and having inclosed valve proper, spring, and deflater, which are protected against injury and secured against accidental loss or escape, and I provide certain other features of improvement, all of which will be hereinafter more fully set forth.

Figure 1:
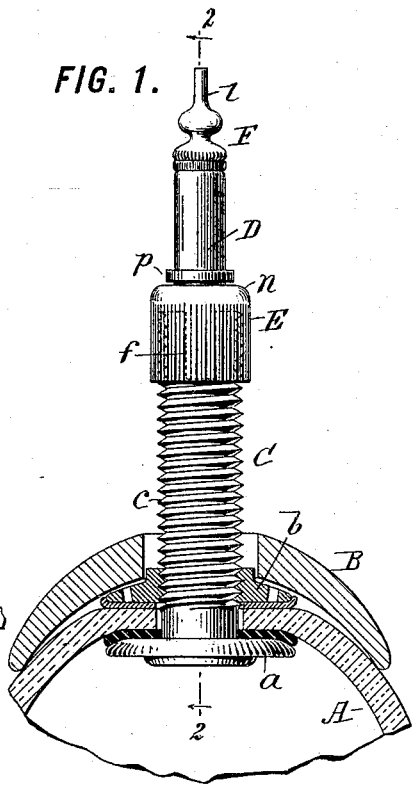
Figure 3:
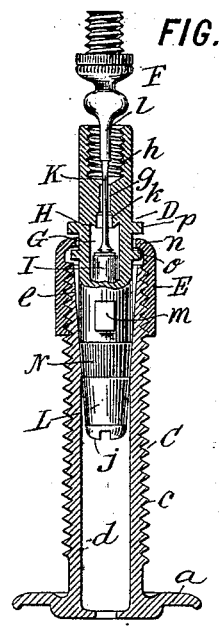
Figure 5:
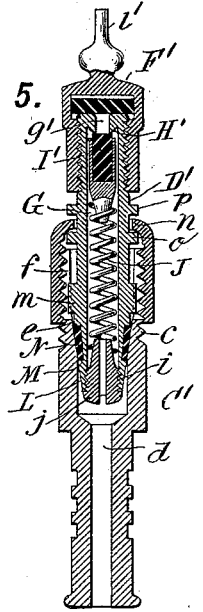
Figure 4:
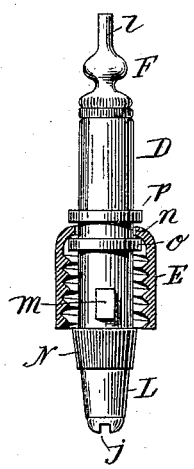
Figure 6:
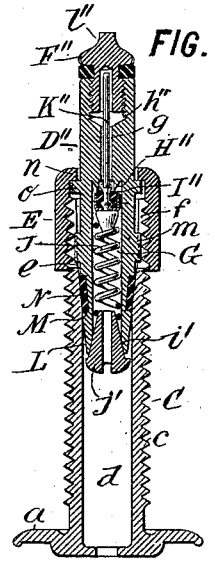

In the accompanying drawings, Figure 1 is a cross-section of a bicycle-tire and felly provided with the usual valve-attaching tube, showing the preferred form of my new valve member thereon in elevation. Fig. 2 is a transverse axial section thereof on the line 2 2. Fig. 3 is an axial section of the tire-tube, showing the valve member in side elevation and partly in section and the cap inverted to deflate the valve proper. Fig. 4 is a side elevation of the valve member alone, its sleeve being shown in section. Fig. 5 is an axial section of a modified construction of valve member applied to a tire-tube adapted to be fastened within the cot of a tire; and Fig. 6 is a similar section of a modified construction of valve applied to an ordinary tire-tube of the shoe class like that shown in Figs. 1, 2, and 3.

Referring to the drawings, let A represent the tire, and B the felly, of a wheel; C, the metal tire-tube passing through the felly and tire, having a flange $a$ within the tire and a nut $b$ screwing against the tire and clamping it against this flange. The tube C has the usual outer screw-thread $c$, a hollow interior $d$, a tapering socket $e$ in its outer end, and notches $f$ through its walls at this end.

D is the member constituting the detachable valve member, clamped to the tube C.

E is the coupling, screwing onto the tube C to hold the member D thereon, and F is the dust-cap for the outer end of the valve member.

According to one feature of improvement the member D is tubular and has an internal valve-chamber G between its ends, which chamber has at its outer end a valve-seat H, on which closes a valve proper, I. Beyond the seat H the member D has a contracted neck $g$, from which to its outer end it is formed with a screw-threaded socket $h$. Beyond the inner end of the valve-chamber the member has an internal screw-thread $i$, which is engaged by a tubular screw-threaded plug $j$, which prevents escape of the parts of the valve, but permits communication from and to the valve-chamber. A spring J, confined in the chamber between the valve proper and plug and surrounding their oppositely-tapering ends, holds the valve proper toward the seat. A deflater K, consisting of a pin passing through the neck $g$ and having an enlarged inner end preventing its escape therefrom outwardly by being held in the enlargement $k$ near the seat, projects loosely into the socket $h$ and serves for unseating the valve when it is to be deflated, which can be done by unscrewing the cap F from the socket $h$, inverting it, and pressing its finger $l$ against the end of the pin, as shown in Fig. 3. The length of the deflating-pin and of the valve proper is sufficient to prevent pressing of the pin entirely through the neck, its inward motion being positively arrested by the striking of the valve proper against the plug $j$.

According to another feature of improvement the member D is constructed with a tapering end L for fitting in the socket $e$ of the tube C and with an annular groove M in the outer wall of this end, in which groove is located a ring N of packing material, which ring is tightly compressed in the groove and between the valve member D and tire-tube C when these parts are coupled together by the clamping-sleeve E. Beyond the groove M the member may be provided with one or more projecting ears $m$ for entering the notches $f$ and preventing rotation of the member, as usual.

Swiveled to the member D is the clamping-sleeve E, which has an internal screw-thread fitting the thread $c$ of the tire-tube and an inner flange or shoulder $n$, engaging a shoulder $o$ on the member D, and thereby forcing this member in as the sleeve is screwed on the tube. Preferably the member has a second shoulder or projection $p$ above the sleeve E, which engages the flange $n$ and prevents escape of the sleeve and which is struck by this flange when the sleeve is unscrewed, so that the member is caused to free itself with the unscrewing of the sleeve. The flange $n$ is formed in the construction shown by bending in the upper end of the sleeve E into the groove between the shoulders $o$ and $p$.

The valve proper (shown in Figs. 2 and 3) consists of an imperforate bar of rubber incased in a cup-shaped metal piece having a tapering lower end and nearly fitting the interior of the valve-chamber. In this construction the valve member D, with its coupling-sleeve E and cap F, constitutes a complete valve proper ready for coupling to any of the tubes C, which can be previously fixed and, if desired, vulcanized to the tires A, so that the valve member can be removed during the operation of connecting the metal tire-tube to the tire and applied afterward, and it and its delicate parts will thereby be saved from injury during such operation. The valve member can be applied or removed by simply turning the sleeve in one direction or the other, and the tight joint between the valve member and tire-tube is insured by their reciprocal tapering faces and the confined annular washer surrounding these faces, which is compressed radially by the operation of forcing the parts together. The working parts of the valve cannot be lost or injured, but can be readily removed for repair or renewal. They are suitably inclosed and protected, so that the member can be sold in the form shown in Fig. 4 for application to any of the usual tire-tubes C.

It will be seen that my invention provides improvements in tire-valves which can be readily and advantageously availed of, and it will be understood that the invention is not limited to the exact details of construction set forth as constituting its preferred form, but that it can be employed according to such modifications as circumstances or the judgment of those skilled in the art may dictate without departing from the spirit of the invention.

One modification is shown in Fig. 5 in which no deflater-pin is employed, the neck $g'$ being short and the seat H' being so near the end of the valve member D' that the finger $l'$ of the cap F' can be pressed directly against the valve proper, I', for deflating the valve. The cap is here shown as an inclosing cap screwing over the end of the member instead of into its end, and the tire-tube C' is of the class adapted to be fastened in the cot of a pneumatic tire instead of being clamped to the tire itself. In other respects the parts are substantially identical with those before described and bear the same letters of reference.

Fig. 6 shows a modification in which a stem-valve is employed consisting of a valve proper, I'', engaging the seat H'' and having a projecting stem K'', by means of which the valve proper can be unseated to deflate the valve by inverting the cap F'' and pressing its finger $l''$ against the same. The member D'' here has only the flange $o$, engaged by the flange $n$ of the sleeve E, for holding the member in the tube C, the sleeve being freely separable from the member and it being necessary to pull the member out of the tube after the sleeve has been unscrewed from the latter. The inner end of the valve-chamber is here closed by a tapering plug $j'$, which frictionally engages the flaring end $i'$ of the member. In other respects the parts are similar to those described with reference to Figs. 1 to 3 and bear the same reference-letters.

What I claim is—

1. In tire-valves and the like, a tube adapted to be fastened to a tire and having an open end, in combination with a valve member adapted to be coupled to the end of such tube, consisting of a tubular member having an internal valve seat and chamber and an external groove near one end and at that end fitting into such tube until said groove is entirely within the latter, a packing-ring fitting said groove and surrounding said member and completely inclosed between the opposing walls of said parts, a valve proper in said chamber and inclosed therein, and a screw-threaded coupling engaging said member for coupling it to such tube with its end therein.

2. In tire-valves and the like, a tubular valve member having a valve-seat and an end for entering the interior of a tire-tube, and a valve proper within said member, in combination with an internally-screw-threaded coupling irremovably swiveled to said member for fastening it to such tube and interengaging shoulders on the coupling and member for holding the member within such tube and preventing separation of the coupling and member.

3. In tire-valves and the like, a valve member having an internal chamber and valve-seat and a valve proper completely inclosed in said chamber, said member having an end for entering within the valve-tube of a tire, in combination with a screw-threaded sleeve surrounding said member for coupling it to such tube, having an inwardly-projecting flange, and shoulders on said member and sleeve engaging and transmitting the axial motion of the latter in both directions to the former.

4. In tire-valves and the like, a valve member having an internal valve-seat near its outer end, and constituting a valve-casing having a long end for projecting far into the interior of a tire-tube, and a valve proper inclosed therein, an external packing-ring intermediate of the ends of the casing and surrounding said long end thereof for entering entirely within the interior of such tube, and a coupling-sleeve surrounding the casing outwardly of said ring.

5. In tire and other valves, a member D, having an internal valve-chamber and valve-seat, and an external tapering end surrounding said chamber for fitting entirely into the valve-tube of a tire, and having a projection outwardly of said end for preventing rotation of said member, a ring of packing material surrounding and held on said end, and a valve proper inclosed in said member, and means holding said valve proper therein.

6. For tire-valves and the like, a valve-member D having an internal valve chamber and seat, a plug closing the inner end of said chamber, a valve proper in the latter, a spring between said valve and plug, said member having a groove around its inner end, a packing-washer in said groove, a cap at the outer end of said member and a sleeve swiveled to said member between said cap and its inner end, substantially as and for the purpose set forth.

In witness whereof I have hereunto signed my name in the presence of two subscribing witnesses.

GEORGE H. F. SCHRADER.

Witnesses:
GEORGE H. FRASER,
THOMAS F. WALLACE.